United States Patent [19]

Bianchi et al.

[11] 4,166,437

[45] Sep. 4, 1979

[54] METHOD AND APPARATUS FOR CONTROLLING THE OPERATING PARAMETERS OF AN INTERNAL COMBUSTION ENGINE

[75] Inventors: Valerio Bianchi, Hochdorf; Reinhard Latsch, Vaihingen-Enz; Peter-Jürgen Schmidt, Schwieberdingen, all of Fed. Rep. of Germany

[73] Assignee: Robert Bosch GmbH, Stuttgart, Fed. Rep. of Germany

[21] Appl. No.: 819,189

[22] Filed: Jul. 26, 1977

[30] Foreign Application Priority Data

Jul. 27, 1976 [DE] Fed. Rep. of Germany ....... 2633617

[51] Int. Cl.² .............................................. F02D 5/00
[52] U.S. Cl. ...................... 123/32 EC; 123/119 EC; 123/32 EE; 123/32 EA
[58] Field of Search ........ 123/32 EA, 32 EB, 32 EC, 123/32 ED, 32 EE, 119 EC; 60/276, 285

[56] References Cited

U.S. PATENT DOCUMENTS

| | | | |
|---|---|---|---|
| 3,749,070 | 7/1973 | Oishi et al. | 123/32 EA |
| 3,750,632 | 8/1973 | Zcehnall | 123/32 EA |
| 3,789,816 | 2/1974 | Japlin et al. | 123/32 EA |
| 3,906,207 | 9/1975 | Rivere et al. | 123/32 EE |
| 4,030,462 | 6/1977 | Sascuzama et al. | 123/32 EE |
| 4,031,866 | 6/1977 | Asano | 123/32 EE |
| 4,040,394 | 8/1977 | Wahl et al. | 123/32 EA |
| 4,044,236 | 8/1977 | Bianchi et al. | 123/32 EA |
| 4,048,965 | 9/1977 | Bianchi et al. | 123/32 EA |
| 4,073,270 | 2/1978 | Endo | 123/32 EB |
| 4,077,364 | 3/1978 | Aoki | 123/32 EE |

OTHER PUBLICATIONS

SAE Paper of Jan. 1973 by J. G. Rivard, Bendix Corp.

*Primary Examiner*—Charles J. Myhre
*Assistant Examiner*—R. A. Nelli
*Attorney, Agent, or Firm*—Edwin E. Greigg

[57] ABSTRACT

In the operation of an internal combustion engine, certain operating parameters, for example the length of fuel injection pulses, the ignition timing and the exhaust gas recycle rate can be adjusted on the basis of information related to state variables of the engine, for example the engine speed, the induction tube pressure, the air flow rate and the like. In particular, the injection pulse length may be determined from data stored in a memory and addressed by a pair of numbers related to the instantaneous values of engine speed and air flow rate. This type of open loop control is rapid and may be very exact but does not account for long-range changes in engine behavior due to wear, etc. For this reason, additional circuitry senses a further state variable, for example, the oxygen content of the exhaust gas or the engine roughness, and uses this information in a feedback loop to generate a correction signal which is then applied in a rate multiplier to the basic fuel injection datum. The closed loop control is effective only in certain operational domains which are indicated by load-related conditions, e.g., the throttle valve opening.

20 Claims, 7 Drawing Figures

METHOD AND APPARATUS FOR CONTROLLING THE OPERATING PARAMETERS OF AN INTERNAL COMBUSTION ENGINE

BACKGROUND OF THE INVENTION

The invention relates to a method and an apparatus for generating control signals for, in particular, the control of the fuel quantity delivered to an internal combustion engine. Other variables subject to the control signals may be the ignition angle and the exhaust gas recycle rate.

Known in the art are methods for determining the duration of fuel injection control pulses which are based on the storage of a set of engine characteristics which are read out for each operational state of the engine as recognized by appropriate sensor signals. The set of characteristic data may be a family of curves relating the throttle valve position to the engine speed (rpm). An open loop control of this type cannot react, however, to deviations and changes of the characteristics that were first set when the engine was new and which are due to aging and wear and tear. For example, various elements and transducers may be subject to drifts, or the engine itself may undergo changes, so that the originally programmed set of characteristic data is no longer correct. Therefore, the fuel metered out to the engine will not be such as to optimize the exhaust gas composition and will therefore not permit the engine to comply with exhaust gas restrictions. The non-optimal performance may also lead to increased fuel consumption and undesirable changes in the operation of the engine.

It is also known to superimpose, on the forward, open loop control based on a characteristic set of data, a closed loop control which uses the output signal from a so-called oxygen or λ-sensor located in the exhaust gas and corrects the fuel quantity fed to the engine so as to maintain a desired engine operation. It is also possible to detect the engine roughness and use that signal as a controlled variable for closing the mixture control loop. These systems however are subject to the following considerations. An internal combustion engine is subject to very rapid changes in operational state and thus requires a rapidly acting closed loop control. This rapid response is counteracted and impeded by the relatively large delays which are due to the time which must pass between the induction of air into the engine and the exhaust of the combusted mixture which provides the control signal.

OBJECT AND SUMMARY OF THE INVENTION

It is thus a principal object of the invention to provide a method and an apparatus for providing control signals which govern the fuel injection, or the ignition angle, the exhaust gas recycle rate, and the like, on the basis of definite operational states of the engine such as engine speed (rpm), aspirated air flow rate Q, induction tube pressure and throttle valve position. It is a further object of the invention to provide a superimposed, and at least temporarily acting, closed loop control process which eliminates any drifts or changes in the engine characteristics and which is able to adapt the fuel injection control pulses for example rapidly to other changing conditions. It is yet another object of the invention to provide the superimposed long-term closed loop control in digital embodiment.

These and other objects are attained according to the invention by providing a circuit which determines the mixture composition of the engine electronically by receiving signals related to the prevailing operational state of the engine, especially the engine speed (rpm) and the air flow rate. These parameters are used to provide an uncorrected injection pulse width. For example, there may be provided according to the invention a storage register in which are stored characteristic data of the engine related to pairs of variables of throttle valve position and rpm and which produce a digital number related to the fuel injection time which then is used to determine the duration of the fuel injection pulse in an open loop control. A system of this type can respond very rapidly and may then be corrected by a superimposed long-term closed loop control which takes care of any quantitative corrections. The long-term closed loop control can also be embodied digitally and operates by generating a correction frequency which is used for correcting the duration of the fuel injection pulses on a constant or temporary basis. It is one of the principal advantages of the present invention that, when the control signals for fuel injection are derived on the basis of engine characteristics and in a sufficiently precise manner, the open loop control is superior to closed loop control. The corrections which are due to environmental conditions, to changes in the behavior of the engine and other influences which can no longer be considered by an open loop control process are then accounted for in the superimposed long-term and preferably digital control system. The invention thus basically makes use of two types of fuel control, a precontrol based on an open loop and characteristic engine data subjected to a second continuous or intermittent closed loop control process. It may be said that the open loop control system is subject to an adaptive or learning process when subjected to the closed loop control. This learned behavior is maintained during the switchover of closed loop to open loop control. In this manner, it is possible to react to very rapidly changing conditions of the engine but at the same time it is possible to compensate for drifts and other deviations without thereby having to accept the disadvantageous closed loop time constants and dead times of the engine.

In the method and apparatus of the invention it is also unimportant if the closed loop control signal is obtained rapidly or slowly, i.e., whether the response time is fast or slow. In one favorable embodiment of the invention, the closed loop control is engaged only during certain load conditions for correcting the fuel data derived from the basic characteristic engine curves. In all other conditions, the closed loop control is shut off and the fuel quantity is derived only from the basic data set but is altered by a factor which is proportional to the previously obtained control deviation. The combination of these two steps leads to a very flexible and universally useable system for operating internal combustion engines and which is capable of adaptation to any requirement.

The invention will be better understood as well as further objects and advantages thereof become more apparent from the ensuing detailed description of two exemplary embodiments taken in conjunction with the drawing.

DESCRIPTION OF THE PREFERRED EMBODIMENTS

General Considerations

The basic principle of the present invention is that a normal open loop control process is able to provide sufficiently precise signals related to the fuel quantity, the ignition angle or the exhaust gas recycle rate if a closed loop control is superimposed thereon at least part of the time for fine tuning and adaptation to prevailing conditions. It is a characteristic of the present invention that at least some of the operational domains are signalled by a control signal derived from the engine operation that is used for a closed loop control process. By way of definition, the term "open loop control" will be used to designate a system or a method in which an apparatus determines a time-varying quantity on the basis of the magnitude of variables which it receives. The apparatus receives no information regarding the success of its adjustment and blindly follows the input instructions to deliver the output signal.

By contrast thereto, a closed loop control process constantly compares the magnitude of a chosen output variable, i.e., the controlled variable, with a set point variable and operates to minimize the difference between the two. Thus a closed loop control process is able to constantly adapt the system on which it operates to changing conditions, or an overall drift.

It would thus seem to be preferable to use a closed loop control process under all conditions. However it has been found that the inherent response times (dead times) encountered in an internal combustion engine and which are based primarily on the passage of time between the inflow and outflow of air to and from the engine cause a much slower response than would be obtainable with open loop control. Thus, an open loop control process can react immediately to changing operational conditions and is thus to be basically preferred.

In the discussion which follows, the invention will be described in relation to the fuel mixture system of an internal combustion engine. More precisely it will be discussed with respect to an electronically controlled gasoline injection system. It should be noted however that the basic principle is applicable to other aspects of an internal combustion engine, for example the adjustment of the ignition angle or the exhaust gas recycle rate.

Figure 1:
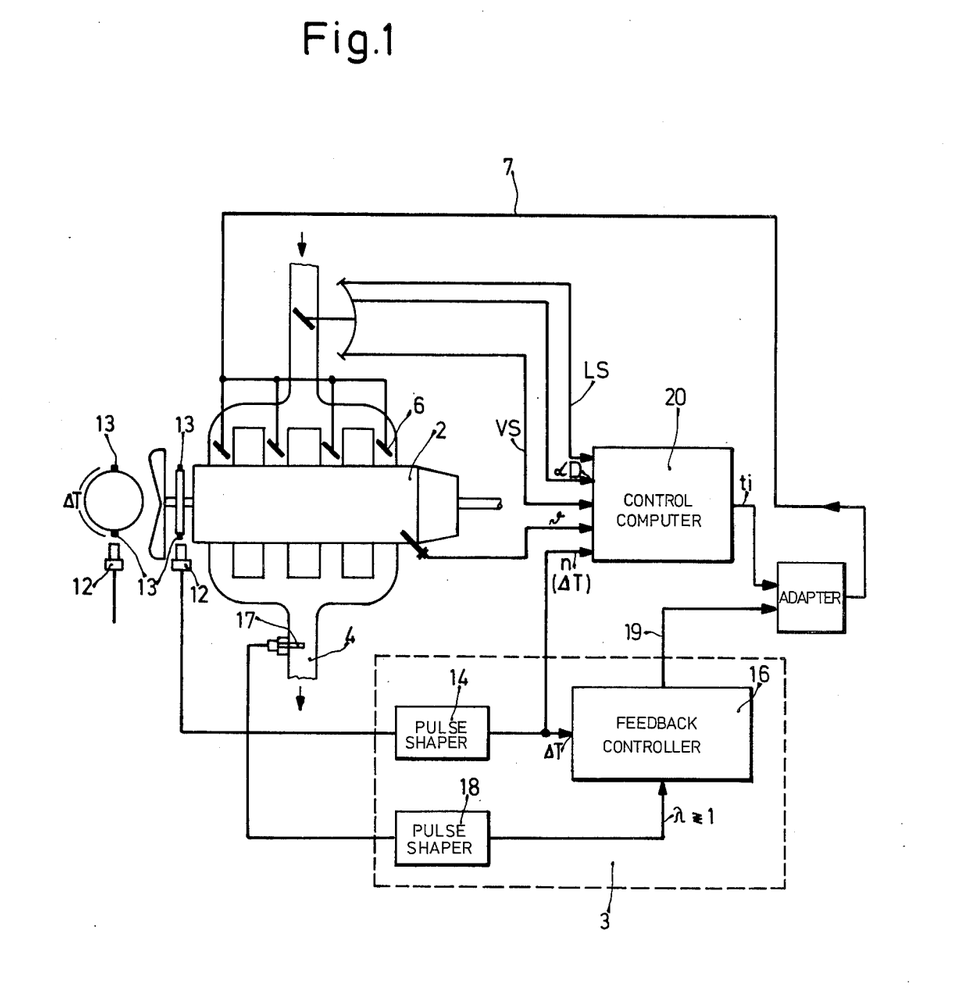
FIG. 1 is an overall block diagram of a fuel mixture control system having both open and closed loop control of the fuel injection pulses.

Turning now to FIG. 1, there will be seen a greatly simplified diagram of the fuel injection system of an internal combustion engine. The cylinders of an engine 2 are provided with fuel by electromagnetic injection valves 6 which are controlled via lines 7 by the output of a control computer 20. A fuel pump, filters and fuel lines, not shown, supply fuel under pressure to the valves 6 so that the fuel quantity is determined by the duration of the fuel injection control pulses $t_i$. Various electrical input lines provide to the control computer 20 information regarding the prevailing status of the engine, for example signals related to load, throttle opening, temperature and rpm. The control computer is constructed to make use of the input variables and use them to generate the correct fuel injection duration $t_i$ for a given set of input data.

Figure 2:
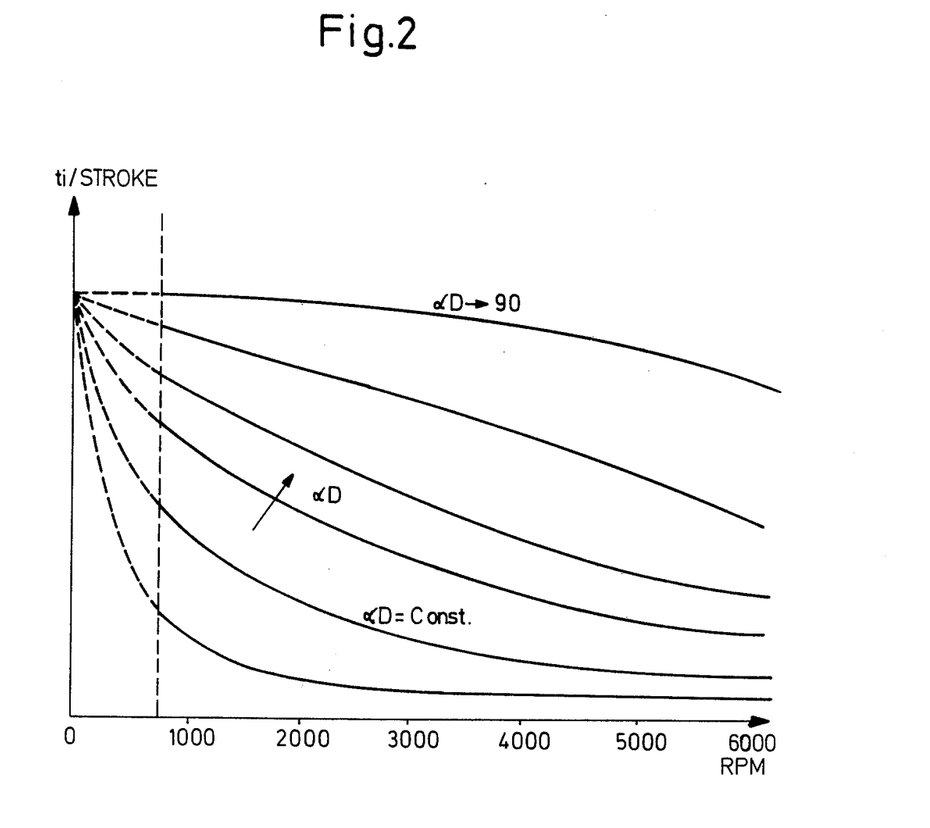
FIG. 2 is a set of curves illustrating the fuel injection time as a function of engine speed (rpm) for a number of throttle openings.

FIG. 2 is an illustration of a characteristic set of engine variables which would be used by the control computer 20 to derive a fuel injection pulse $t_i$ as a function of independent variables, in particular as illustrated the rpm and the throttle opening angle $\alpha_D$. The quantity $t_i$ plotted along the ordinate is proportional to the fuel injected per power stroke. At low rpm, relatively small changes in the throttle valve position are seen to result in relatively large changes in the injected fuel whereas, at relatively high rpm, the change in the injected fuel quantity as a function of throttle valve position is considerably smaller. A set of data is specific to a particular type of engine and should not, in principle, change with time. Such a set of data may be determined by experimentation or measurement for any type of engine and can be used to control fuel injection pulses $t_i$ with any desired degree of precision. Furthermore, the control computer 20 receives data regarding other engine variables through various input lines, for example data regarding the idling position of the throttle valve LS a full load signal VS and the temperature $\theta$.

The rpm-related signal may be generated by a sensor 12 which passes a marker 13 on the crankshaft, preferably in inductive manner. On the basis of the set of characteristic curves which are stored in suitable manner in the control computer 20, the latter is able to produce a sufficiently and if necessary extremely precise fuel injection pulse on the basis of the instantaneous input data. It should be understood that the exact construction of the control computer 20 is not critical and that any suitable device which accepts control information and derives therefrom an output signal based on stored data would be suitable. In particular any known electronic fuel injection system, especially those known as D-Jetronic or L-Jetronic fuel injection systems would be suitable as control computers 20.

In these D-or L-Jetronic systems, the duration of the injection pulse $t_i$ is determined from the air flow rate or the pressure monitored in the induction tube, and the rpm. There may be provided for example a monostable multivibrator with a feedback capacitor. The unstable time constant of the monostable multivibrator is determined by the recharging time in the feedback capacitor which in turn depends on a discharge current source and a charging current source. The discharge current is a measure of the air flow rate and the normally constant charging current is turned on at a time which is inversely proportional to the prevailing engine rpm so that the charging of the capacitor becomes a measure for the engine rpm. In this manner, there is produced an uncorrected injection time in the sense of an open loop control discussed above. Preferably, such devices include mechanisms in which the position of the throttling element produces a constant air flow rate at a given rpm and wherein this flow rate remains the same over the lifetime of an engine. For this purpose, the mechanism may include rotary valves or orifices. It is also possible to monitor the induction tube vacuum and the rpm as variables which determine the calculation of the duration of the injection pulse $t_i$.

Preferably, the present invention is used in conjunction with an open loop control system which uses and is adapted to a set of characteristic data such as illustrated, for example, in FIG. 2. A suitable system which employs fuel injection control based on a set of characteristic curves has been described in the allowed U.S. patent application Ser. No. 638,267 where a digital system is described and in U.S. patent application Ser. No. 638,092 which deals with the analog generation of a fuel injection pulse from an $\alpha_D$ — n set of curves. (The corresponding German patent applications are Nos. P 24 57 461.6 and 24 57 434.3, respectively). The set of characteristic curves may be stored in a memory, for example a so-called read-only memory (ROM) and the injection period may be derived by interpolation for the digital case.

It has already been mentioned that, during the lifetime of an engine, certain changes may occur in various elements of the engine which would affect the correct amount of fuel to be used under particular conditions. Some engine components may be subject to the effects of drift and the engine itself may undergo changes which are due to aging and wear and tear. In that case, the injection pulses derived on the basis of the set of engine data by a fuel control system, for example the control computer 20, would begin to deviate from those which are optimal for exhaust gas emission control or other parameters. It is therefore a particular object and characteristic of the present invention to superimpose on the forward control based on a set of characteristic data a relatively slower acting proportional correction by means of one or more closed control loops. The invention deliberately does not use a very rapidly acting control loop needed to alone control an internal combustion engine, particularly a gasoline engine, the conditions of which change rapidly. Such a rapidly acting control loop would in any case be impeded by the long response times of the engine as already discussed and may not be capable of insuring the overall fuel supply of the engine. It has thus been recognized that a precise and rapidly acting forward control is superior to a closed loop control and it is thus a particular characteristic of the present invention that the precise action of the fuel control is based on a set of characteristic curves while the fine tuning and the adaptation to prevailing environmental conditions, engine aging, and such, is performed by means of a closed loop control for the purpose of which there is provided a control system 3 which is connected to the control computer 20 and which provides to the latter a control signal via a line 19 derived from the instantaneous magnitudes of engine variables. It is of particular significance that the response time of the control signal to prevailing conditions is not of great importance so that it is possible to make practical use of methods of control which could not be used heretofore because of the requirement for rapid response. This combined overall control, i.e., an open loop pre-control based on a set of characteristic curves and a relatively slow acting proportional correction of the set of characteristic curves by closed loop control is capable of performing a satisfactory mixture control even in unstationary engine states. Finally, it is a characteristic of the present invention that the superimposed closed loop control may be operated in only a portion of the operational domain of the engine whereas, in the remainder of the operational domain, the previously obtained control deviation of the control loop is used to alter the set of characteristic data employed by the forward control. In this manner, the transitions between closed and open loop control are made smooth because, when the closed loop control is ineffective, the signal remains at the level which it had prior to control loop interruption.

The closed loop control may be based on two different engine variables as illustrated in FIG. 1. One of these variables is the exhaust gas composition which is monitored in the exhaust manifold 4 of the engine by a suitable sensor, for example a so-called oxygen sensor or λ sensor 17. The output signal from this sensor undergoes an abrupt change depending on the presence or absence of oxygen in the exhaust gas. In the neighborhood of the value $\lambda = 1$, the output voltage undergoes a sharp jump, corresponding to a rich or lean mixture with respect to a stoichiometric mixture. The output signal from the sensor 17 passes a pulse shaping circuit 18 and enters the controller 16. A secondary or alternative control signal may be the engine roughness as monitored for example by the inductive transducer 12 after passage through the pulse shaper 14. The method and apparatus for using the engine roughness for fuel control are known and will not be discussed in further detail. Basically, the engine roughness depends on the fuel-air mixture and thus may be used as a measure for fuel mixture control and enters the controller 16 as the actual value of the controlled variable.

Still other closed loop control systems may be based for example on the maximum torque (M-optimizer) or on minimum fuel consumption. Also known is a control system which monitors the ion current behind the exhaust valve and maintains this current or its fluctuations at a constant value. Generally speaking, all closed loop control systems use one or more engine characteristics to obtain information regarding the type and composition of the combustible mixture and use this information to alter or correct the set of characteristic data used for fuel mixture control.

Basically, the correction of the set of characteristic data may be performed by analog or digital means. Inasmuch as the set of characteristic curves is easily stored digitally in digital memories, it is preferable to conduct the entire method according to the present invention on the basis of digital technology and for this reason the subsequent specific exemplary embodiments of the invention will be in digital form. It should be understood however that this in no way precludes the use of analog circuitry and methods.

Figure 3:
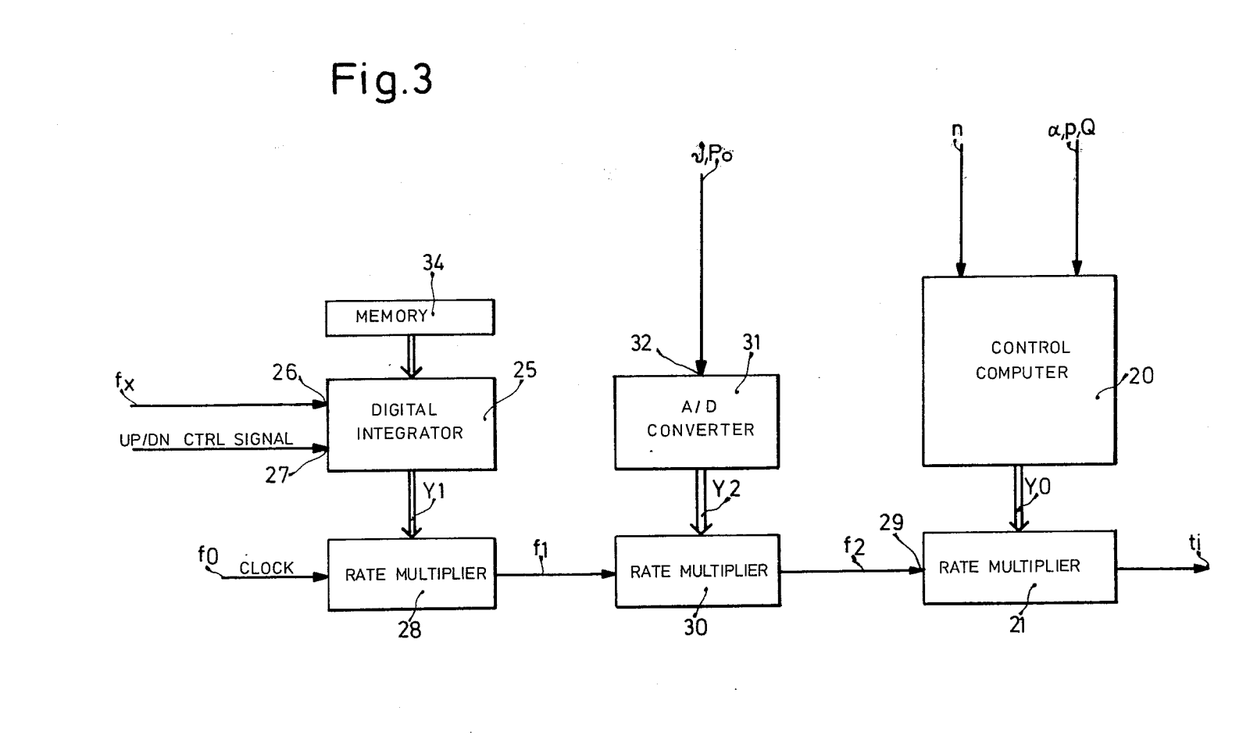
FIG. 3 is a block diagram of a first exemplary embodiment of the invention.

FIG. 3 is a block diagram illustrating the elements of the open loop pre-control and the corrective closed loop control according to the present invention. The control computer is the previously referred to electronic apparatus for generating an uncorrected injection pulse $t_i$ from the prevailing operational states of the engine, namely the rpm n, the induction tube pressure p or the throttle valve position $\alpha_D$ or the air flow rate Q. If the output from the control computer 20 is an analog pulse, the latter may be digitalized by using it for gating a constant frequency supplied to a counter. If the above-mentioned circuit disclosed in the allowed U.S. Pat. application Ser. No. 638,267 is used, this digital number is produced directly.

The digitized injection time $t_i$ is used in a converter 21 which also receives a correction pulse train of frequency $f_2$ to form a final corrected injection pulse $t_i$ at the output. The converter crcuit 21 may be a down counter which receives the uncorrected injection datum $Y_o$ as an initial value and which is counted down at the frequency $f_2$. If the correction frequency $f_2$ is constant, it will be appreciated that the input number $Y_o$ and the output period $t_i$ are directly proportional. By changing the correction frequency, the output pulse $t_i$ may be altered multiplicatively. This multiplicative influence which will be discussed in detail below is used to shift the entire set of characteristic injection data illustrated for example in FIG. 2, in dependence on one or more control variables and to so correct it as to adapt it to various drifts and influences of aging as previously discussed. The correction frequency $f_2$ may also be subject to other influences, for example engine warm-up, ambient air pressure, and the like.

The pulse train of frequency $f_2$ is in turn proportional to a pulse train of frequency $f_1$ which itself depends on the prevailing control signal and is proportional to a clock frequency $f_o$ produced by any suitable apparatus, for example a function generator or oscillator. The control signal-responsive frequency $f_1$ is produced as follows. An up-down counter 25 is clocked at relatively low rate by a pulse train of frequency $f_x$. The low frequency $f_x$ is fed to the counting input 26 of the up-down counter 25. The signal which determines if the up-down counter counts up or down is provided at the input 27 and is determined by the control loop signal which is made bivalent and thus occupies the states logical 0 or logical 1. This control signal may be based on the known λ-control (exhaust gas oxygen control) and may be formed by a known threshold comparator which receives the output voltage of the λ sensor at one input and a suitable set point signal at the other input. The set point signal itself may be constant or may be variable depending on conditions. The counter 25 which operates in the manner of an integrator, produces a digital number Y1, the magnitude of which depends on the control signal at the input 27. The digital number or word Y1 is transformed into the pulse train frequency $f_1$ by means of a number-to-frequency converter 28 of known construction and generally referred to as a "rate multiplier", for example as marketed under the type designation Ser. No. 5497 by, for example, the firm Texas Instruments. These circuits receive a number $Y_i$ and a constant or variable input frequency $f_o$ which they use to produce an output frequency $f_1$ in multiplicative fashion, substantially obeying the formula $$f_1 = f_o \cdot (Y_i/M)$$

in which M is constant and corresponds in this case to the maximum register length.

The output frequency $f_1$ of the rate multiplier 28 is thus subject to the influence of the control signal and may be fed directly to the input 29 of the converter circuit 21. However, in the exemplary embodiment illustrated, it is first fed to a second rate multiplier 30 which produces the previously mentioned pulse train of frequency $f_2$. The second rate multiplier 30 serves to take account of other correcting factors which are received in the form of the digital number Y2 at the input of the rate multiplier 30. These correcting variables may be for example the engine temperature so that the fuel injection pulses $t_i$ are responsive to starting or warm-up conditions of the engine. An AD converter 31 receives a temperature related analog signal and is used for producing therefrom a digital word Y2. Other correcting variables, for example the ambient air pressure, etc., may be similarly exploited. A circuit which may be used for a converter 31 is described for example in the German patent application No. P 25 51 688.5. This circuit senses correcting variables and transforms them into a digit as well as immediately into a correcting frequency.

The output frequency from the rate multiplier 30 is again given by a formula such as that related to the multiplier 28, namely $$f_2 = f_1 \cdot (Y2/M).$$

When the overall system, for example the engine, is first started, the up-down counter 25 is supplied with a fixed value which is inserted by a memory 34 and may be the number provided by the basic characteristic data set.

Figure 4:
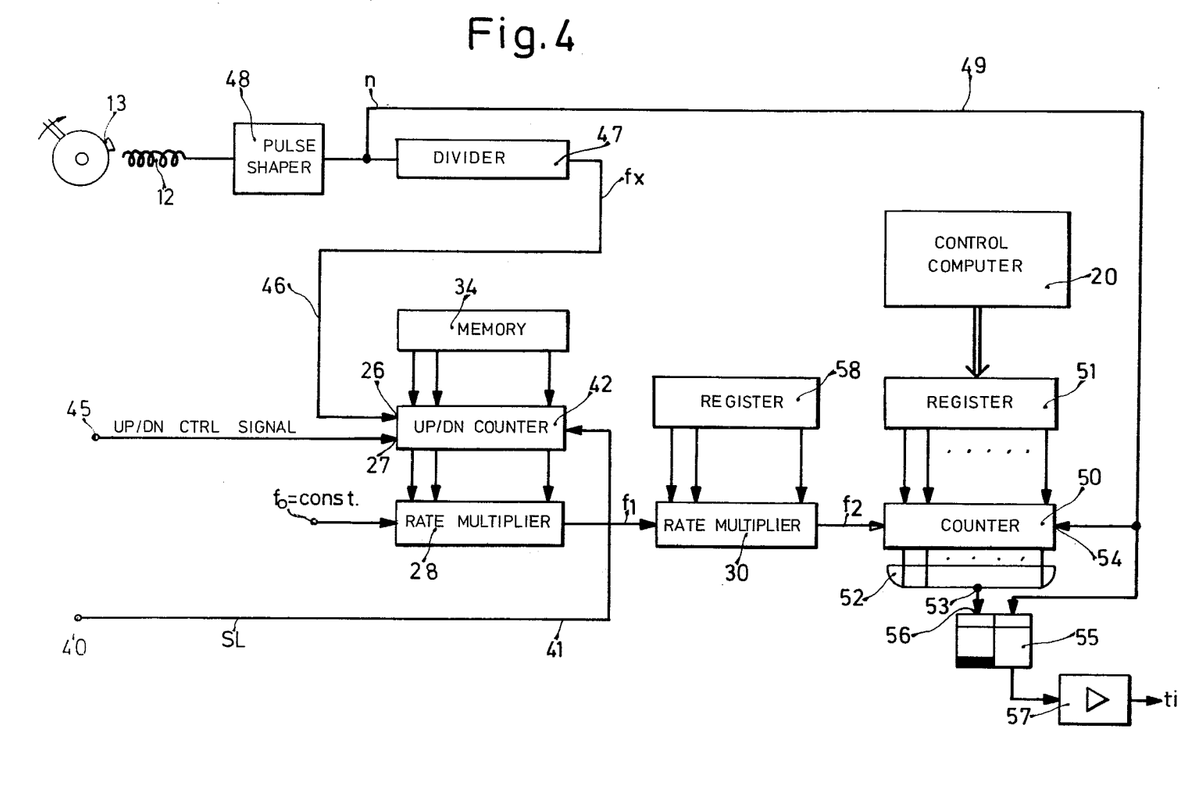
FIG. 4 is a more detailed illustration of the first embodiment of the invention according to FIG. 3.

The control system according to the invention is illustrated in greater detail in FIG. 4 where similar components retain the same reference numerals. The up-down counter 42 within the digital integrator 25 receives at its load input a starting signal SL delivered from an input contact 40 via a line 41 and serving to load into the counter the digital word provided by the memory 34. The direction of counting is determined by the signal received at the contact 45 and the low frequency pulse train $f_x$ is received via a line 46 from the rpm-related signal generated by the crankshaft transducer 12, 13 and subdivided by a dividing circuit 47. A pulse shaper 48 insures that the pulses fed to the divider have the proper electrical characteristics. The rpm signal n is also delivered via a line 49 to the set input of a down counter 50 in the converter circuit 21 which thereby receives at this time a digital number corresponding to the prevailing injection period. This latter number is counted down with the aid of the correction frequency $f_2$ and thus, after the lapse of a certain period of time, causes the counter 50 to have the content 0 which is sensed by a gate circuit 52 and causes the output 53 of the latter to assume the logical value 1. The same rpm pulse which was fed to the input 54 and caused the transfer and onset of count-down was also supplied to set a bistable flip-flop 55 which is thus caused by the reset signal from the output 53 to form a pulse of well defined length which is suitably corrected and constitutes the final fuel injection control pulse $t_i$ if necessary amplified by an amplifier 57. This pulse may be fed directly to control the fuel injection valves 6.

A correction factor related to engine warm-up and/or air pressure may be supplied by a register 58 which provides a suitable digital word to the rate multiplier 30.

Suitable embodiments of circuits which may be used for the up-down counter 42 and the down counter 50 are those marketed under the type designation Ser. No. 74191, for example by the firm Texas Instruments. A suitable divider circuit 47 is that marketed under the type designation Ser. No. 7493A, for example by Texas Instruments Corporation.

Figure 5:
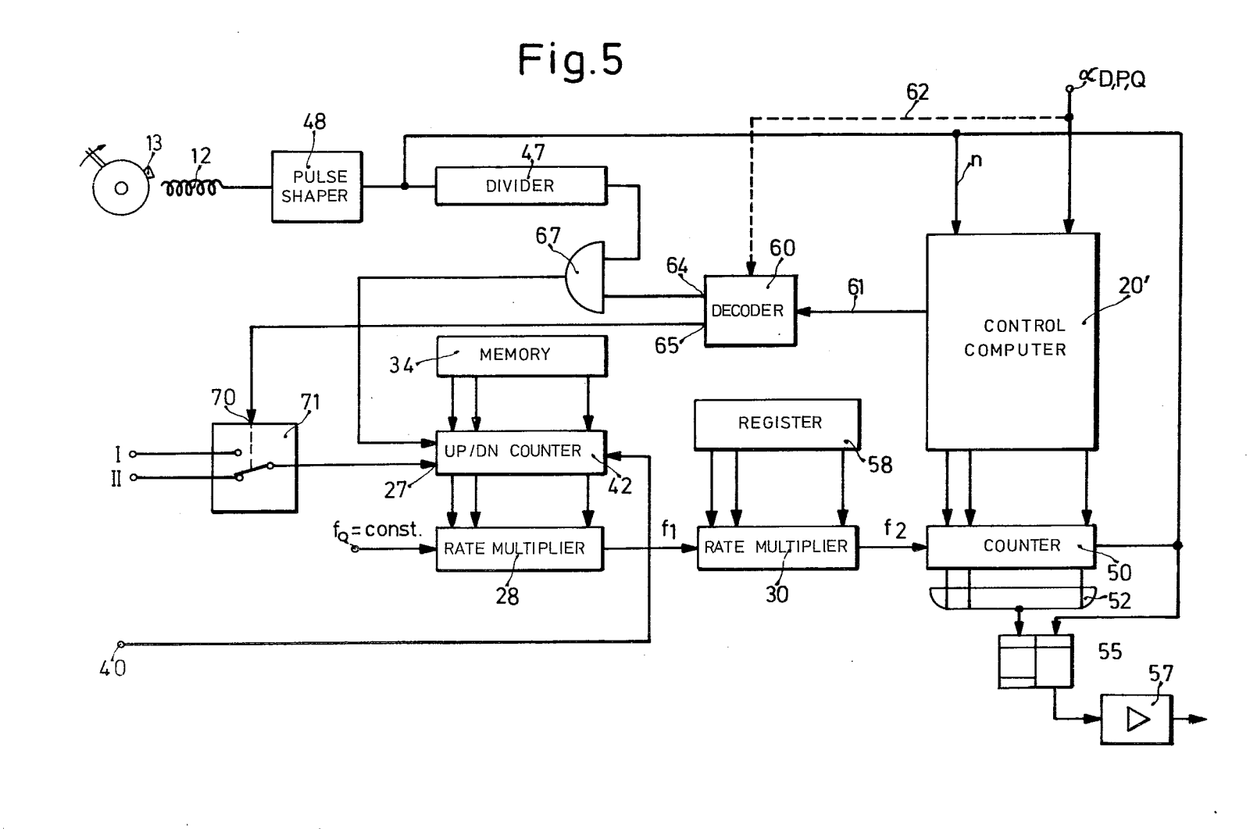
FIG. 5 is a diagram of a second exemplary embodiment of the invention including a possibility of alternating between two control signals.

A second exemplary embodiment of the invention is illustrated in FIG. 5 and is suitable where the closed loop control is to take place only in a part of the overall operational domain of the engine whereas, in the remaining part of the operation, the injection takes place on the basis of forward control, albeit altered by the previous setting of the control deviation.

In addition to providing a possibility for a changeover from closed loop to open loop control, there is also made provision for operating with different control signals, in particular a control signal I and a control signal II, the former related to lean burning at partial engine load and the latter related to full load operation.

Elements of the circuit of FIG. 5 which are similar to those of FIG. 4 retain the same reference numerals. The circuit of FIG. 5 additional includes a decoder circuit 60 which recognizes specific operational states and produces suitable output signals. In the exemplary embodiment shown, it is intended to switch over from closed loop control to open loop control in load dependent manner while retaining a factor related to the previous control deviation. For this purpose, the decoder 60 decodes signals related to load, for example the position $\alpha_D$ of the throttle valve, the induction tube pressure p or the aspirated air flow rate. These magnitudes may be provided to the decoder in digital form via lines 61 by the electronic control computer 20'. Alternatively, the decoder circuit may immediately receive these magnitudes from suitable transducers via a line 62. Preferably, however, the electronic control computer 20' is supplied with pulse trains whose frequency is related to the magnitudes of the signals $\alpha_D$, p or the air flow rate Q and it transforms them into a digit supplied to the decoder circuit. In the exemplary embodiment shown, the decoder circuit 60 has two outputs 64 and 65, the former of which goes to the input of a gate circuit 67. The operation is such that when the engine load is used as the controlling operational state, the gate circuit 67 closes above a given load as controlled by the decoder 60. This causes the counting pulses provided by the divider circuit 47 to be interrupted so that the up-down counter 42 maintains the content which was previously affected by the control signal I or II. The frequency $f_1$ thus remains constant and is different from the basic clock frequency $f_o$ only by a factor based on the previous control deviation. Thus in certain operational states, for example above a certain load, a switchover occurs to open loop control. This manner of operation may be maintained for any load above a certain value, for example above a throttle valve position corresponding to $\alpha_D = 60°$ while below that value various control loops are engaged. The second output 65 of the decoder 60 is used to switch over from a first control signal I to a second control signal II by means of a switch 71. The control signals I and II are both bivalent and may assume the values logical 0 or logical 1.

Figure 6:
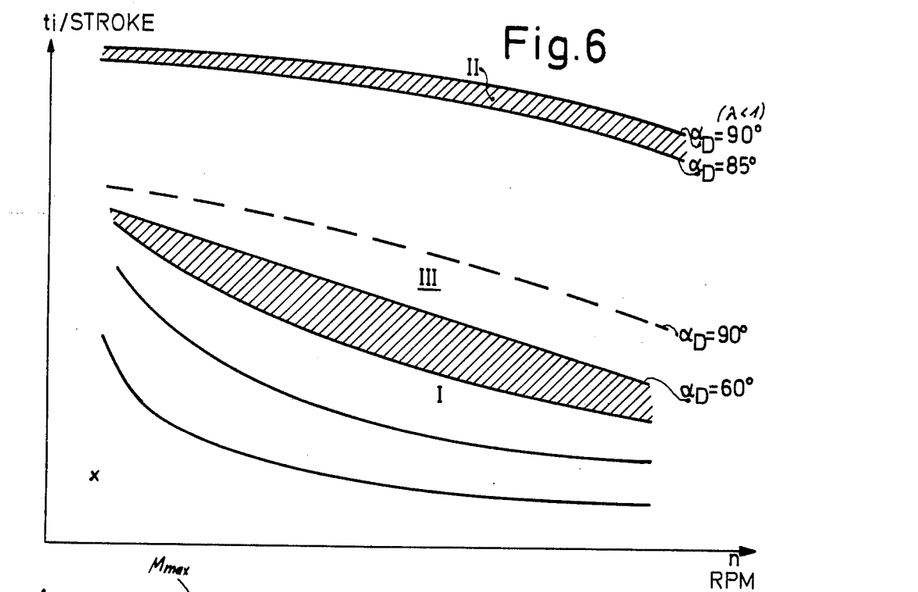
FIG. 6 is a diagram illustrating the effects of operating with one or the other control signal.

By switching from one to the other of these signals different effects may be obtained depending on engine conditions. The possibilities provided by the circuit of FIG. 5, i.e., the ability to change over from a fuel injection control based on a control signal I to a closed loop control based on a control signal II or, again, to a purely forward control, is now explained with the aid of FIG. 6. FIG. 6 is a diagram in which the injection quantity or the duration of the injection pulse $t_i$, for example per power stroke, is plotted as a function of the engine speed (rpm) n with the throttle valve opening angle $\alpha_D$ as a parameter. The diagram of FIG. 6 is somewhat similar to the set of data illustrated in FIG. 2, however, it illustrates the possibilities provided by the various manners of control. Thus FIG. 6 illustrates a first control region I for throttle valve positions ranging from 0 to $\alpha_D = 60°$ in which so-called lean buring is employed, i.e., in this region, the signal related to the controlled variable is so processed that the engine receives a relatively lean mixture. The cross in the vicinity of the origin of coordinates indicates the idling state of the engine. The circuit of FIG. 5 may be so constructed for example that, above a throttle valve position $\alpha_D = 60°$, the system switches over to open loop control in a region labeled III extending up to the throttle valve position $\alpha_D = 90°$. This would correspond to a normal operation of the engine in properly warmed up condition and under normal external conditions. As previously discussed, when the system enters the open loop control region III, the previously used correction factor relating the actual fuel injection, as a result of closed loop control, and the number defining $t_i$ based on the characteristic engine data, is retained. As previously explained, when the gating circuit 67 blocks, the up-down counter 42 retains the number which it held at the time of transition. Thus the overall system may be said to be learning whenever it is in the closed loop mode, i.e., it adapts itself to prevailing ambient conditions and controls out any drift errors and performs an adaptation which is then maintained in the open loop domain, in which it is possible to respond very rapidly to changing operational conditions due to the absence of relatively high response times.

An alternative manner of operating the circuit of FIG. 5 is illustrated in FIG. 6 where, beginning with the throttle valve position $\alpha_D = 85°$, a closed loop control is reengaged under the influence of the control signal II. The switchover is made by the switch 71 of FIG. 5. In the domain of full load control where, as illustrated in FIG. 6, a relatively long injection pulse $t_i$ is to be expected, it is subjected to a constant correction as between the required injection quantity and that prescribed by the basic set of engine data and delivered by the electronic control computer 20'. The transition from open loop control to closed loop control under the control of the signal II is also smooth because the up-down counter 42 changes its frequency only slowly due to the low magnitude of the counting frequency $f_x$.

The engine variable which may be used to obtain the control signal I, i.e., the lean burning control signal, may be for example the engine roughness or the ion current control while the full load control under the influence of the signal II may be based on torque optimizing, $\lambda$ control or other suitable methods.

It is thus a significant and substantial element of the present invention that certain operational domains of the engine which may be referred to as load regions and which are related, for example, to the throttle valve position $\alpha_D$, are subjected to a closed loop control by a suitable system, whereas other operational domains of the engine are governed by pure forward, open loop control while however maintaining a correction factor previously obtained by the closed loop control system and providing the necessary correction between the actual injected fuel quantity and that prescribed by a set of characteristic data incorporated in the engine at the time of construction. If $\lambda$ control is used, the basic engine data set may be sufficiently precise to permit open loop control at the operational point $\lambda = 1.0$. Under full load, for example beginning with the throttle valve position $\alpha_D = 80°$, it would be suitable to switch over to closed loop control.

Figure 7:
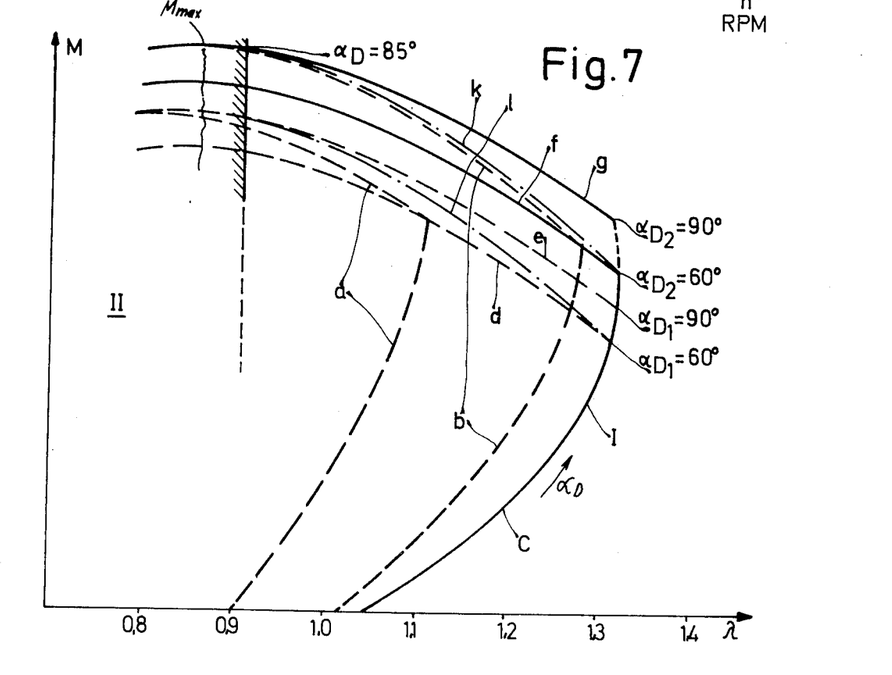
FIG. 7 is a diagram illustrating engine torque as a function of air factor $\lambda$ for a set of curves related to different throttle opening angles.

FIG. 7 is a diagram illustrating the engine torque M as a function of the air factor λ related to the mixture composition with the parameter $\alpha_D$, i.e., the throttle valve position illustrated in various curves and in the different control domains. If the methods of control described in the present invention are used, it is possible to dispense with corrections of the fuel injection quantity on the basis of the pressure or temperature of the aspirated air. The dashed curve a shows the basic initial engine data control for a high ambient temperature T and a low ambient pressure p. The curve b shows the basic engine data for a low ambient temperature T and a high ambient pressure p. The curve c is obtained for the control domain I for lean burning control and this curve is transformed at the point $\alpha_{D1}=60°$ into the dashed curve d for decreasing air factors λ. At the point $\alpha_{D1}=90°$ it is transformed into the parallel curve e. The values $\alpha_{D1}$ are related to high ambient temperature and low ambient pressure, whereas two further values $\alpha_D=60°$ and $90°$ relate to high ambient temperature and low ambient pressure p. At the values $\alpha_{D2}$, the curve c which is related to lean burning is continued in parallel branches f and g for decreasing λ. The region of full load control, i.e, the control domain II, is also shown in FIG. 7 and is seen to include the maximum torque $M_{max}$. The curves k and l illustrate the adaptation between the two control domains I and II under closed loop control in the domain I.

The foregoing relates to preferred exemplary embodiments of the invention, it being understood that other embodiments and variants thereof are possible within the spirit and scope of the invention.

What is claimed and desired to be secured by Letters Patent of the United States is:

1. A method of operating an internal combustion engine by controlling the magnitude of an operating parameter, said parameter being one of the class which includes fuel injection control pulses, ignition timing, exhaust gas recycle rate and the like, and comprising the steps of:
   monitoring the magnitude of state variables of the engine, said state variables being one or more of the class which includes engine speed, air flow rate, induction tube pressure, throttle valve position, exhaust gas composition and the like, and using the magnitude of said state variables to derive therefrom the appropriate setting for said operating parameter;
   comparing at least one of said state variables temporarily with a set-point value for providing a feedback correction signal for said operating parameter;
   and wherein said step of providing a feedback correction signal for said operating parameter occurs only when the engine operates in specific conditions and wherein the correction signal is maintained constant and equal to the last value obtained by feedback control when said engine is operated purely on the basis of said stored set of data of said operating parameter;
   whereby errors due to wear and aging and other influences are compensated for.

2. A method as defined by claim 1, wherein said step of deriving the appropriate setting for said operating parameter is performed by interrogating a memory in which settings of said operating parameter are related to specific magnitudes of said state variables, said settings of said operating parameter being specific to a particular engine type.

3. A method as defined by claim 1, wherein said state variables the magnitude of which is monitored are the throttle valve position and the engine speed (rpm).

4. A method as defined by claim 1, wherein the uncorrected magnitude of said operating parameter is the uncorrected injection time for fuel injection valves as provided by an electronic injection system as a digital datum and that said feedback correction signal is a pulse train with a correction frequency which is applied preferably multiplicatively to said digital datum.

5. A method as defined by claim 4, wherein from idling up to a predetermined lower load condition the basic fuel injection pulse is corrected under the influence of a closed loop lean burning control and wherein above said lower load condition the correction factor determined from closed loop control is retained and applied to the open loop control based on a set of characteristic data and wherein beginning with a second and upper load condition a renewed closed loop correction of the injection pulses takes place on the basis of full load control to an air factor of λ equal to unity.

6. A method as defined by claim 5, wherein said pulse train with a correction frequency is obtained by integrating a relatively low frequency in digital manner and wherein the direction of integration is determined by a bivalent control signal whereby the output signal from said digital integration is changed multiplicatively into another frequency in dependence on the algebraic sign of said control signal.

7. A method as defined by claim 6, wherein said digital integration is performed by dividing the frequency related to engine speed.

8. A method as defined by claim 7, wherein the counting direction of said digital integration is determined by the status of operation of said engine, one direction being associated with lean burning at partial load and the other of said directions being associated with full load operation.

9. An apparatus for operating an internal combustion engine by controlling the magnitude of an operating parameter, said parameter being one of the class which includes fuel injection control pulses, ignition timing, exhaust gas recycle rate, and the like, comprising:
   means for detecting the magnitude of one or more state variables of said engine, said state variables being of the class which includes engine speed, air flow rate, induction tube pressure, throttle valve position, exhaust gas composition, and the like; and for generating detection signals related thereto;
   control computer means for receiving at least two of said detection signals and for deriving therefrom the magnitude of said operating parameter;
   feedback circuit means, for receiving a further one of said detection signals and for comparing it with as set-point value and for providing, temporarily, a correction signal for correcting the magnitude of said operating parameter and wherein said further detection signal is the signal from an oxygen sensor located in the exhaust system of the engine and wherein said apparatus further comprises means for translating the signal from said oxygen sensor into a bivalent control signal and wherein said operating parameter is the length of control pulses for the fuel injection valves of said engine, and wherein said control computer means includes a digital memory in which values of said fuel control pulse lengths are stored as a function of the characteristics of said engine as defined by throttle valve position and engine speed; whereby the magnitude of said control pulse is obtained by supplying prevailing values of said state variables, and wherein said control computer means provides a digital word related to the magnitude of the uncorrected fuel injection control pulse and wherein said apparatus further comprises a converter circuit receiving said digital word and also receiving a correction frequency from a further circuit which transforms said further detection signals and wherein said correction frequency and said digital word are used to generate a final fuel injection control pulse.

10. An apparatus as defined by claim 9, wherein said converter circuit is a digital down counter which receives said digital word preferably parallel as an initial value and which counts down said digital word with said correction frequency and wherein the duration of said fuel injection pulse is defined as the time elapsing from the delivery of said digital word into said counter and the occurrence of the content 0 in said counter.

11. An apparatus as defined by claim 10, further comprising a digital integrator for generating said correction frequency, the counting input of said digital integrator being provided with a low frequency and the direction of counting of said integrator receiving a bivalent control signal.

12. An apparatus as defined by claim 11, further comprising a rate multiplier which receives the digital number generated by said digital integrator and which further receives a constant counting frequency whereby said rate multiplier generates a variable output frequency.

13. An apparatus as defined by claim 12, wherein the output frequency of said rate multiplier varies according to the algebraic sign of said control signal and is applied to said converter circuit for generating said corrected fuel injection pulse.

14. An apparatus as defined by claim 12, further comprising a second rate multiplier receiving the output from said rate multiplier and for further receiving a digital word related to a correcting influence such as temperature and air pressure and wherein the output of said second rate multiplier is supplied to said converter circuit for generating said corrected fuel injection pulse.

15. An apparatus as defined by claim 12, further comprising a correction circuit containing a register for receiving input signals related to external operational states of said engine such as temperature and external pressure and which generates a digital word related to the warm-up characteristics of said engine.

16. An apparatus as defined by claim 12, further comprising a transducer means for generating an rpm-dependent signal and a digital divider circuit for receiving said rpm-dependent signal and generating therefrom a pulse train of lower frequency which constitutes said lower frequency applied to said up-down counter.

17. An apparatus as defined by claim 12, wherein said correction frequency applied to said down counter of said converter circuit is generated continuously and wherein the transfer of the digital word corresponding to the uncorrected fuel injection time is placed in said down counter by an rpm-dependent pulse delivered to its set input and wherein there is further provided a gate circuit for recognizing the content 0 of said down counter and a bistable flip-flop receiving the output from said gate circuit at the reset input thereof and wherein the set input of said flip-flop receives the same rpm-dependent pulse which effected the transfer of said digital word in said down counter.

18. An apparatus as defined by claim 12, further comprising a decoder circuit for receiving signals related to the load of the engine, the output of said decoder circuit being connected to a gate circuit for suppressing the supply of said pulse train of low frequency to said up-down counter, thereby changing from closed loop control to an open loop control while maintaining the correcting signal last obtained by closed loop control.

19. An apparatus as defined by claim 17, further comprising a switching circuit switched by a second output of said decoder circuit for connecting the input of said up-down counter which determines the direction of counting with one of two contacts related to different control domains.

20. An apparatus as defined by claim 9, further including means for generating a signal related to engine speed and means for transforming said signal related to engine speed into a bivalent control signal and means for using said bivalent control signal to generate said correction signal for correcting the magnitude of said operating parameter.

* * * * *